(12) United States Patent
Buttimer et al.

(10) Patent No.: US 8,494,049 B2
(45) Date of Patent: Jul. 23, 2013

(54) LONG TERM REFERENCE FRAME MANAGEMENT WITH ERROR VIDEO FEEDBACK FOR COMPRESSED VIDEO COMMUNICATION

(75) Inventors: Maurice J. Buttimer, Media, PA (US); J. William Mauchly, Berwyn, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 1374 days.

(21) Appl. No.: 11/736,717

(22) Filed: Apr. 18, 2007

(65) Prior Publication Data

US 2008/0247463 A1      Oct. 9, 2008

Related U.S. Application Data

(60) Provisional application No. 60/910,710, filed on Apr. 9, 2007.

(51) Int. Cl.
*H04N 7/12*      (2006.01)

(52) U.S. Cl.
USPC .................................................. 375/240.12

(58) Field of Classification Search
USPC .................................................. 375/240.12
See application file for complete search history.

(56) References Cited

U.S. PATENT DOCUMENTS

| | | | |
|---|---|---|---|
| 6,049,570 A | 4/2000 | Fukunaga et al. | 14/6 |
| 6,111,915 A | 8/2000 | Fukunaga et al. | 375/240 |
| 2001/0040700 A1 | 11/2001 | Hannuksela et al. | 1/417 |
| 2003/0067637 A1 | 4/2003 | Hannuksela | 1/46 |
| 2003/0138045 A1* | 7/2003 | Murdock et al. | 375/240.12 |
| 2005/0105809 A1 | 5/2005 | Abe et al. | 382/236 |
| 2005/0254584 A1* | 11/2005 | Kim et al. | 375/240.27 |
| 2006/0083298 A1 | 4/2006 | Wang et al. | 375/240.01 |
| 2006/0098738 A1* | 5/2006 | Cosman et al. | 375/240.16 |
| 2007/0008323 A1* | 1/2007 | Zhou | 345/475 |
| 2007/0201755 A1* | 8/2007 | Chen et al. | 382/240 |

FOREIGN PATENT DOCUMENTS

| | | |
|---|---|---|
| EP | 0763944 | 3/1997 |
| FR | 2880745 | 7/2006 |
| WO | WO 2006/075070 | 7/2006 |

OTHER PUBLICATIONS

PCT Search Report for PCT Application PCT/US08/59065.
Extended European Search Report on EPO Application No. 08744890.8 mailed Nov. 14, 2011.

(Continued)

*Primary Examiner* — Gilberto Barron, Jr.
*Assistant Examiner* — Devin Almeida
(74) *Attorney, Agent, or Firm* — Dov Rosenfeld; Inventek

(57) ABSTRACT

An apparatus, software encoded in tangible media, and a method at an encoder. The method includes sending compressed video data including a reference frame message to create a long term reference frame to a plurality of decoders at one or more destination points, receiving feedback from the decoders indicative of whether or not the decoders successfully received the reference frame message, and in the case that the received feedback is such that at least one of the decoders did not successfully receive the reference frame message or does not have the indicated recent frame, repeating sending a reference frame message to create the long term reference frame. Using the method can replaces I-frame error recovery with long term reference frames, even in the case where the reference frame management messages are lost to at least one decoder.

24 Claims, 7 Drawing Sheets

OTHER PUBLICATIONS

Kimata et al: "A Study of Keyframe Reference Picture Selection Method for Error Resilient Multiple Video Objects Distribution", Multipmedia and Expo, 2000; 2000 IEEE International Conference, New York, NY, USA; vol. 3, Jul. 30, 2011, pp. 1479-1482.

"Text of ISO/IEC 14496-10 FCD Advanced Video Coding", MPEG Meeting, Klagenfurt, Aug. 11, 2002.

Wenger, S.; Knorr, G.D.; Ott, J.; Kossentini, F.: "Error resilience support in H.263+," IEEE Transactions on Circuits and Systems for Video Technology, vol. 8, Issue 7, Nov. 1998 pp. 867-877.

Yao Wang; Wenger, S.; Jiantao Wen; Katsaggelos, A.K.: "Error resilient video coding techniques," IEEE Signal Processing Magazine, vol. 17, Issue: 4, Jul. 2000, pp. 61-82.

T.Wiegand, N.Fürber B.Girod, "Error-resilient video transmission using long-term memory motion-compensated prediction," IEEE J. Select. Areas Commun., vol. 18, pp. 1050-1062, Jun. 2000.

Thomas Wiegand, Xiaozheng Zhang, and Bernd Girod, "Long-Term Memory Motion-Compensated Prediction," IEEE Transactions on Circuits and Systems for Video Technology, vol. 9, No. 1, Feb. 1999, pp. 70-84.

Farber, N.; Girod, B.; Villasenor, J.: Extensions of ITU-T recommendation H.324 for error-resilient video transmission, IEEE Communications Magazine, vol. 36, No. 6, Jun. 1998, pp. 120-128.

B. Girod, N. Färber, E. Steinbach : *"Error-Resilient Coding for H.263"*, in: D. Bull, N. Canagarajah, A. Nix (eds), Insights into Mobile Multimedia Communication, Academic Press, 1999, pp. 445-459.

Sunil Kumar, Liyang Xu, Mrinal K. Mandal and Sethuraman Panchanathan, "Error Resiliency Schemes in H.264/AVC Standard," Elsevier J. of Visual Communication & Image Representation (Special issue on Emerging H.264/AVC Video Coding Standard), vol. 17, No. 2, Apr. 2006, pp. 425-450.

H. Chung mid A. Ortega, "Efficient memory management control for H.264," Proceedings, 2004 International Conference on Image Processing (ICIP-2004), pp. 777-780, 2004.

Wei Tu and Eckehard Steinbach, "Proxy-Based Reference Picture Selection for Real-Time Video Transmission Over Mobile Networks," Institute of Communication Networks, Media Technology Group. 2005.

PCT Preliminary Report on Patentability for PCT Application No. PCT/US2008/059065, Nov. 14, 2011.

* cited by examiner

ITU-T H.264 Memory management control operation (mmco) command values

| mmco value | mmco operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

FIG. 5 (Prior Art)

LONG TERM REFERENCE FRAME MANAGEMENT WITH ERROR VIDEO FEEDBACK FOR COMPRESSED VIDEO COMMUNICATION

RELATED APPLICATION

The present invention claims benefit of priority of and is a conversion of U.S. Provisional Patent Application No. 60/910,710 filed 9 Apr. 2007 to inventors Buttimer et al., and titled LONG TERM REFERENCE FRAME MANAGEMENT WITH ERROR FEEDBACK FOR COMPRESSED VIDEO COMMUNICATION. The contents of such U.S. provisional patent application 60/910,710 are incorporated herein by reference.

FIELD OF THE INVENTION

The present disclosure relates generally to video communication.

BACKGROUND

When compressed video is sent from a source to a destination over a network, lost packets can cause visible errors. At the source, a source coder typically uses temporal predictive coding, also called interframe coding wherein a difference between a frame and a reference picture is coded. Such an interframe coded frame is sometimes called an INTER frame. In the case of packet communication to a destination point, if there is an error, e.g., a missed packet, errors can propagate to subsequent frames. One solution is for the source to occasionally but sufficiently frequently send an independently coded frame, e.g., that is not dependent on some past frame, e.g., an intraframe coded frame, also called an INTRA frame. An independently coded frame is also called an I-frame. I-frames, however, use more bits than INTER frames, so to increase compression, it is desirable to not send I-frames.

When communication from the destination back to the source of communication is possible, error resilient methods are known that use feedback from a decoder as to whether or not there has been an error such as a lost packet. An encoder receiving such feedback can correct the error, e.g., by encoding the next frame in such a way that it does not reference the erroneous data. One method is for the encoder to send an I-frame upon being informed of an error. A more efficient method is for the encoder to start using a different, e.g., earlier frame as the reference frame for temporal predictive coding. In such a case, the encoder needs to indicate to the decoder that it has done so, and which frame is the reference frame for predictive coding such that the encoder and decoder can maintain synchronization about which frame is being used as a reference picture for interframe coding. This can help avoid using intra-coded I-frames.

Known methods for using feedback to provide reference image error resilience deal with a single transmitting encoder and single receiving decoder. With the advent of high definition, decoding systems are known that use many decoders, e.g., many programmable processors ("decoding processors") that each decode different portions of the image simultaneously. The encoder and the decoders each include a memory that maintains a data structure for storing reference images used for coding/decoding interframe coded data. Each decoder can provide feedback to indicate to the encoder whether or not it has received data. At the source, the encoder can respond by sending instructions to the decoders at the destination to use one or another reference picture. A problem occurs when some but not all decoders correctly receive such instructions. The encoder needs to be sure that all decoders at the destination are using the same appropriate reference picture.

A similar problem arises in a multipoint video teleconferencing system. Suppose an encoder at a source transmits coded video to a plurality of destinations that each has at least one decoder. The source encoder and each destination's decoder or decoders each includes a memory with a data structure for storing reference images used for coding/decoding interframe coded data. Each destination decoder can provide feedback to indicate to the source encoder whether or not the destination has correctly received data. The source encoder can respond by sending instructions to use one or another reference picture at each destination's decoder. A problem occurs when some but not all destinations, e.g., each decoder at each destination, correctly receive such reference picture instructions. The source encoder in such a situation needs to be sure that all destination decoders are using the same appropriate reference picture.

SUMMARY

Embodiments of the present invention include a method, and apparatus, and logic encoded in one or more computer-readable tangible medium to carry out a method. The method is to manage use of reference frames between an encoder transmitting to a plurality of decoders via a network, and the plurality of decoders receiving data from the network, wherein the network is error-prone, and wherein the decoders provide feedback to the encoder. The method is to ensure that the encoder and the decoders all use the same long-term reference picture.

One embodiment includes a method comprising an encoder at a source sending compressed video data including a reference frame message to create a long term reference frame from a recent frame indicated in the reference frame message, the sending being to a plurality of decoders at one or more destination points. The method further includes receiving feedback from the plurality of decoders indicative of whether or not the decoders successfully received the reference frame message and have access to the indicated recent frame. In the case that the received feedback is such that at least one of the decoders did not successfully receive the reference frame message or does not have the indicated recent frame, repeating sending a reference frame message to create the long term reference frame from an indicated recent frame to the plurality of decoders, and receiving feedback until the encoder has received feedback from each of the plurality of decoders indicating successful receipt of the reference frame message and indicating having access to the recent frame indicated in the reference frame message, such that once the encoder has an indication of successful receipt and access at all decoders, the encoder, upon receiving feedback of an error from at least one of the decoders, is operable to use the long term reference frame as a reference frame for temporal predictive encoding of video, thereby enabling the encoder to avoid using an independently coded frame upon receiving feedback of an error.

In one embodiment, the encoder from time to time sends an additional reference frame message to create a different long term reference frame from a different recent frame indicated in the reference frame message, the sending being to the plurality of decoders at the one or more destination points, such the long term reference frame is updated from time to time with an updated frame, any updated frame not becoming valid for use as a reference frame until the encoder has received feedback from all decoders that each has successfully received the reference frame message and has the updated frame.

One embodiment includes an apparatus comprising a network interface operable to be coupled to a network and an encoder coupled to the network interface and operable to generate compressed video data and to embed therein a reference frame message to command any receiving decoder to create a long term reference frame from a recent frame indicated in the reference frame message. The apparatus further includes a controller coupled to the network interface and the encoder and operable to cause the encoder to send the compressed video data with the reference frame message embedded therein, the sending being via the network to a plurality of decoders at one or more destination points, the controller further operable to accept feedback received from the plurality of decoders indicative of whether or not the decoders successfully received the reference frame message and have access to the indicated recent frame. The controller is further operable in the case that the received feedback is such that at least one of the decoders did not successfully receive the reference frame message or does not have the indicated recent frame, to cause the encoder to repeating sending a reference frame message to create the long term reference frame from an indicated recent frame to the plurality of decoders, the controller further operable to receiving feedback until feedback is received from each of the plurality of decoders indicating successful receipt of the reference frame message and indicating having access to the recent frame indicated in the reference frame message, such that once the controller has an indication of successful receipt and access at all decoders, the controller can, upon indication that feedback of an error was received from at least one of the decoders, the controller is operable to cause the encoder use the long term reference frame as a reference frame for temporal predictive encoding of video, thereby enabling the encoder to avoid using an independently coded frame as a result of the apparatus receiving feedback of an error.

One embodiment includes an apparatus comprising means for encoding data to form compressed video data, means for embedding a reference frame message with the compressed video data, the reference frame message to command a decoder to create a long term reference frame from a recent frame indicated in the reference frame message, means for sending the compressed video data including the reference frame message to a plurality of decoders at one or more destination points; and means for receiving feedback from the plurality of decoders, the feedback indicative of whether or not the decoders successfully received the reference frame message and have access to the indicated recent frame. The apparatus further includes control means operable, in the case that the received feedback is such that at least one of the decoders did not successfully receive the reference frame message or does not have the indicated recent frame, to cause the means for encoding, means to embedding, and means for sending to repeat sending a reference frame message to create the long term reference frame from an indicated recent frame to the plurality of decoders, and operable to cause the means for receiving to receive feedback until feedback has been received from each of the plurality of decoders indicating successful receipt of the reference frame message and indicating having access to the recent frame indicated in the reference frame message, such that once the means for receiving has an indication of successful receipt and access at all decoders, the control means, upon the means for receiving's receiving feedback of an error from at least one of the decoders, is operable to cause the means for encoding to use the long term reference frame as a reference frame for temporal predictive encoding of video, thereby enabling the means for encoding to avoid using an independently coded frame upon the apparatus receiving feedback of an error.

An apparatus as recited in claim 24, wherein the control means is operable, from time to time to cause sending an additional reference frame message to create a different long term reference frame from a different recent frame indicated in the reference frame message, the sending being to the plurality of decoders at the one or more destination points, such the long term reference frame is updated from time to time with an updated frame, any updated frame not becoming valid for use as a reference frame until the apparatus has received feedback from all decoders that each has successfully received the reference frame message and has the updated frame.

One embodiment includes logic, e.g., software encoded in one or more tangible media at an encoder for execution and when executed operable to implement a method comprising an encoder at a source sending compressed video data including a reference frame message to create a long term reference frame from a recent frame indicated in the reference frame message, the sending being to a plurality of decoders at one or more destination points. The method further includes receiving feedback from the plurality of decoders indicative of whether or not the decoders successfully received the reference frame message and have access to the indicated recent frame. In the case that the received feedback is such that at least one of the decoders did not successfully receive the reference frame message or does not have the indicated recent frame, repeating sending a reference frame message to create the long term reference frame from an indicated recent frame to the plurality of decoders, and receiving feedback until the encoder has received feedback from each of the plurality of decoders indicating successful receipt of the reference frame message and indicating having access to the recent frame indicated in the reference frame message, such that once the encoder has an indication of successful receipt and access at all decoders, the encoder, upon receiving feedback of an error from at least one of the decoders, is operable to use the long term reference frame as a reference frame for temporal predictive encoding of video, thereby enabling the encoder to avoid using an independently coded frame upon receiving feedback of an error.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

BRIEF DESCRIPTION OF THE DRAWINGS

FIG. 5 shows the commands that can be used in reference frame messages for signaling from an encoder to decoders in one embodiment of the invention.

DESCRIPTION OF EXAMPLE EMBODIMENTS

Figure 1A:
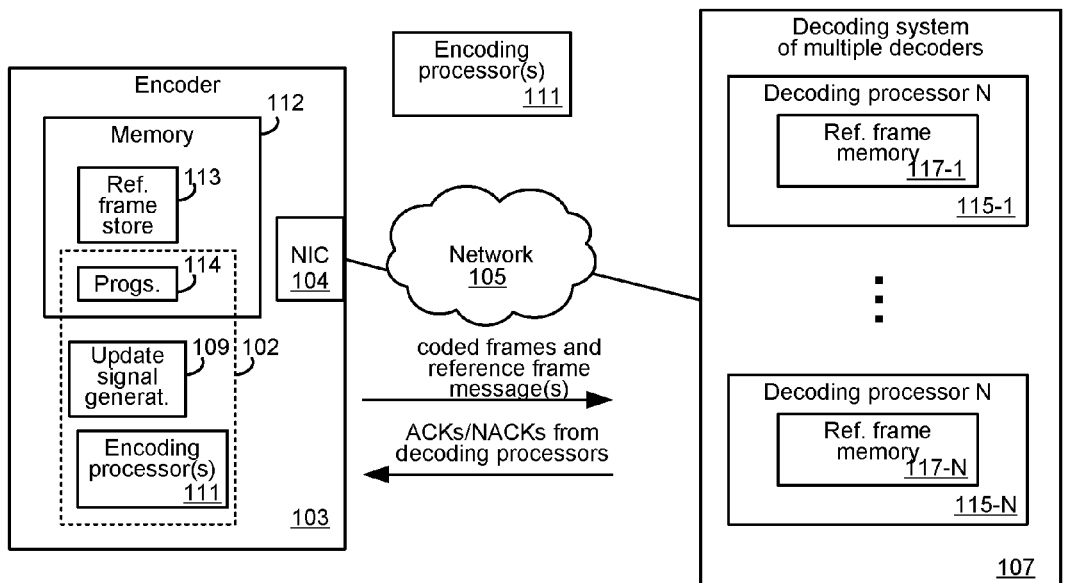
FIG. 1A shows an embodiment of an encoder and an embodiment of a decoding system of a plurality of decoders, with the encoder and each of the decoders maintaining a reference frame store. The encoder and decoder operate according to encoder embodiments of the present invention.

Embodiments of the present invention include a method, and apparatus, and logic encoded in one or more computer-readable tangible medium to carry out a method. The method is to manage use of reference frames between an encoder at a source transmitting to a plurality of destination decoders via a network, and the plurality of decoders receiving data from the network, wherein the network is error-prone, and wherein the decoders provide feedback to the encoder. The method is to ensure that the encoder and the decoders all use the same long-term reference picture.

NEWPRED, H.263+ and H.264

One known method for a destination decoder to provide feedback to a source encoder in order to provide error resilience with respect to use of reference pictures is called NEWPRED. NEWPRED has become annex N to the ITU-T H.263 video coding standard. NEWPRED and similar methods define error recovery tools for interframe coded frames including a mechanism to select a reference picture for INTRA frames, mechanisms for a destination decoder to send feedback and for a source encoder to receive and act on feedback such as positive acknowledgement (ACK) messages from the decoder that data, e.g., information indicating which reference frame is being used was properly received, and negative acknowledgement (NACK) that an error has occurred. NEWPRED provides a mechanism to avoid sending INTRA frames (I-frames) and to avoid unnecessary retransmission of coded data.

For use of NEWPRED in the version of H.263 called H.263+, see Wenger, S.; Knorr, G. D.; Ott, J.; Kossentini, F.: "Error resilience support in H.263+," IEEE Transactions on Circuits and Systems for Video Technology, Volume 8, Issue 7, November 1998 Pages 867-877. Also see ITU-T, SG15/WP15/1, LBC-95-033, Telenor R&D, "An error resilience method based on back channel signaling and FEC," January 1996 (also submitted to ISO/IEC JTC1/SC29/WG11 as contribution MPEG96/M0616). For a description of NEWPRED applied to long-term reference pictures, see, Thomas Wiegand, Niko Färber, Klaus Stuhlmüller, and Bernd Girod: "Error-Resilient Video Transmission Using Long-Term Memory Motion-Compensated Prediction," IEEE Journal on Selected Areas in Communications, Vol. 18, No. 6, pp. 1050-1062, June 2000.

The recent ITU-T H.264 video compression standard, also called AVC for Advanced Video Coding and MPEG4 part 10 provides for the use of multiple reference frames. A source encoder and a destination decoder each maintain a data structure for storing reference frames. The H.264 standard provides for two classes of reference frames: short-term reference frames, which are recent frames maintained as a buffer from the newest to the oldest recent frame, and long-term reference frames (LTRFs). Which reference frame is used is commanded by slice header information. There are explicit commands for the encoder to issue to manage long term reference frames.

Some embodiments of the present invention are applicable to an encoder and decoders that conform to at least parts of the H.264 standard. The invention, however, is not restricted to H.264, and can be used for any temporally coded compressed video that allows for the use of long term reference frames.

Example Architectures

FIG. 1A shows an embodiment of an encoder 103 at a source and an embodiment of a destination that includes a decoding system 107 of a plurality of decoders, say a number denoted N decoders 115-1, . . . , 115-N, with N>1. Each of the decoders 115-1, . . . , 117-N are in one embodiment programmable processors, e.g., computers or computing cores that include a memory encoded with programming instructions. Other embodiments include decoders that include special purpose hardware. The encoder 103 includes a network interface (NIC) 104 coupled to a packet network 105, and is operable to create compressed video data to send as packet data to a destination that includes the decoding system 107 that is coupled to the packet network 105.

In one embodiment, the encoder includes a programmable encoding processor 111 and a memory 112 that includes programming instructions 114 to implement the encoder and to implement a controller function, shown in dotted block 102. The encoding processor under control of the controller function is operable to encode video data, including interframe coded frames using a reference frame. The controller function is operable to cause the encoder to send the coded bitstream as packet data to the decoding system 107.

The decoding system is operable to receive a bitstream from the encoder via the network 105, and is operable to distribute the parts of the bitstream corresponding to different portions of the same frame to the plurality of decoders 115-1, . . . , 115-N so that each can decode the bitstream of its respective portion. The encoding processor 111 maintains a data structure we call a reference frame store 113, stored in the memory 112. The reference frame store 113 is also called a reference frame memory and is for storing reference frames, including short term reference frames and at least one long term reference frame. Each of the decoders 115-1, . . . 115-N maintains a respective reference frame store 117-1, . . . , 117-N. In one embodiment, each reference frame store 113, 117-1, . . . , 117-N includes space for at least two long term reference frames. The encoder and decoders operate according to encoder and decoder embodiments of the present invention.

One application of embodiments of the invention is when the source including the encoder is part of a two-way videoconferencing terminal that also includes a decoding system, and when the destination that includes the decoding system 107 is part of a two-way videoconferencing terminal that also includes an encoder.

Figure 1B:
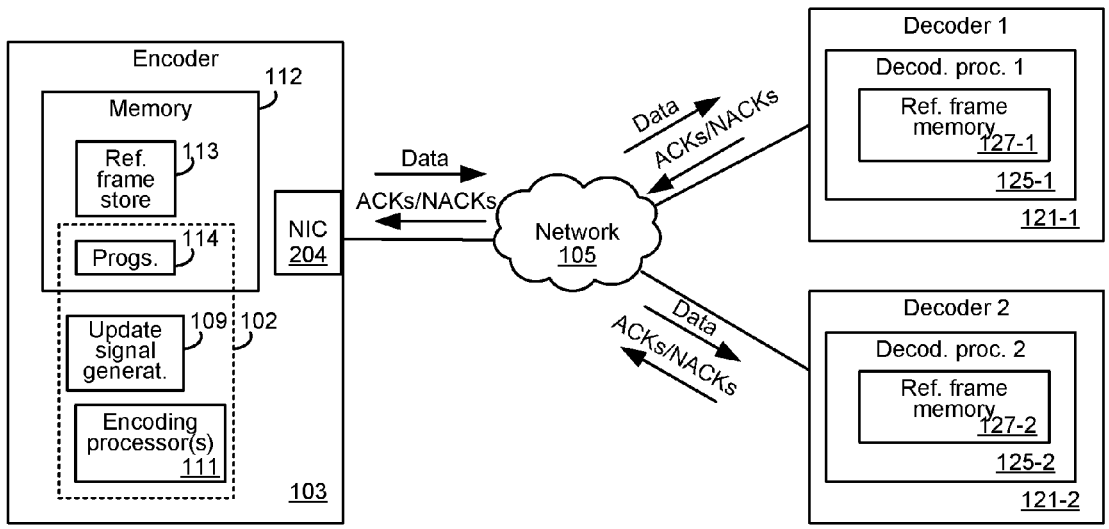
FIG. 1B shows an embodiment of an encoder and embodiments of a plurality of decoders at different endpoints coupled via a network, with the encoder and decoders each maintaining a reference frame store. The encoder and decoder operate according to encoder embodiments of the present invention.

FIG. 1B shows an arrangement particularly applicable to videoconferencing via a network wherein transmission errors may occur. At least three terminals are coupled to a network 105. Suppose one terminal is a source and includes an encoder 103 such as in FIG. 1A and is operable to transmit to at least two other terminals that are destinations that have respective decoders 121-1, 121-2, . . . . While each decoder 121-1, 121-2, . . . can further be comprised of a plurality of decoders, e.g., a plurality of decoding processors as shown in FIG. 1A, for purposes of explanation, suppose each decoder 121-1, 121-2, . . . has a single decoder 125-1, 125-2, . . . , respectively. Each of the encoder 103 and decoders 125-1, 125-2, . . . maintains a respective data structure a respective reference frame store 113, 127-1, 127-2, . . . that includes elements for short term and long term reference frames. The encoding processor and decoders operate according to encoder and decoder embodiments of the present invention.

In one embodiment, each encoder and decoder encodes to and decodes from compressed high-definition video data compressed according to the H.264 standard that provides for use of both short term reference frames such as a set of one or more of the previous-most frames, and for use of at least one long term reference frame (LTRF). The reference frame store provides for including one or more LTRFs.

For the remainder of the description, unless otherwise stated, the architecture of FIG. 1A is assumed. The same methodology is applicable to the architecture of FIG. 1B of sending to a plurality of destinations that each have a decoding system that includes a decoding processor. The same method also is applicable to an architecture that combines features of both FIG. 1A and FIG. 1B: a source that includes an encoding system coupled to a network and sending to a plurality of destinations, each having a decoding system, with at least one of the decoding system including multiple decoders such as programmable decoding processors that operate simultaneously on different portions, e.g., different slices of a frame.

Forming Long Term Reference Frames

While in one embodiment, each decoder 115-1, . . . , 115-N is operable to process a slice, different embodiments use decoders operable to processes portions that are not a single slice. Continuing with the decoder-per-slice at a time embodiment, as in the H.264 standard, a reference frame message including commands ("reference frame commands") to create and destroy LTRFs can be embedded at the slice level of the bitstream such that a decoder can take appropriate action. The encoder thus can signal in the H.264 slice header that a particular frame in the reference frame store is to be designated as a LTRF.

In one embodiment, the controller function 102 of the encoder is operable to cause the encoder to send a reference frame message embedded in the bitstream to indicate to the decoders which frames to use as reference frames, including which are to be used as long term reference frames and which are to be marked to not be used as reference frames.

One embodiment uses a reference frame message that includes commands that conform to the ITU-T Rec. H.264 standard. In one embodiment, the reference frame message includes what are called "reference frame commands" herein, including one or more commands as follows: to not use one or more frames from the reference frame store as reference frames; to cause the transfer of a frame from short-term to long-term status in the reference frame store, to use the current picture as a long term reference picture; to specify the number of possible long term reference frames; and to reorder such frames.

Once a LTRF is properly established, any subsequent frame could then use the LTRF as a reference, in one embodiment, the LTRF is used as a reference only in a special case. That case is when error feedback from the decoder has informed the encoder that a recent frame was corrupted by packet errors or otherwise not correctly received. The encoder creates the next new frame with references solely to the LTRF and not to the most recent short term reference frame. However, it is important that all decoders have the correct LTRF.

One embodiment of the invention is applicable to an encoder at a source that is operable to send compressed data including a reference frame message to a plurality of decoding processors at one or more destination points.

Figure 2A:
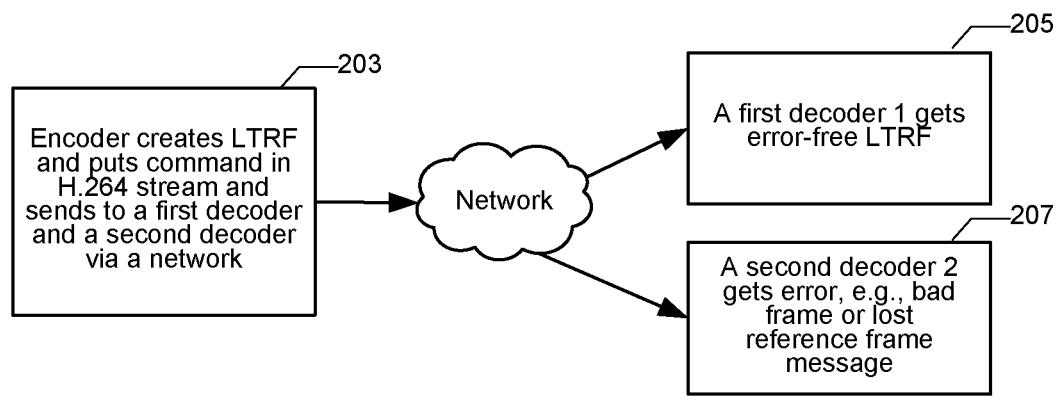
FIG. 2A shows a representation of an embodiment of an encoder sending a reference frame message to a first and second decoder, and one decoder correctly receiving the reference frame message and a second decoder experiencing an error.

FIG. 2A shows data flow for an encoder, in 203, creating a LTRF and signaling, via a reference frame message in the encoded bitstream instruction for a plurality of decoders, including a first decoder and a second decoder, to receive the LTRF and the reference frame message to set up the LTRF in the decoders. Such a reference frame message of reference frame commands may be sent by a source with an encoder to create a new LTRF, or to signal that an encoded frame uses one or another stored LTRF as the reference in the inter frame coding. The possibility that the LTRF or a command related to its use is corrupted during transmission raises complications. A problem encountered is that the commands to manage the reference frames must be sent to every decoder including the first and second decoder. If a packet is lost and at least one decoder does not receive the reference frame management command, then it will be out-of-synchronization with the other decoder or decoders. Such a situation is shown in FIG. 2A. In 205, the first decoder correctly receives the LTRF and the reference frame message to create it. In 207, the second decoder has one or more packet errors so it does not receive the frame to be used as the LTRF or it does not correctly receive the reference frame message. As a result, the reference frame stores at the first and second decoders will be out of synchronization.

The situation of FIG. 2A is applicable to the example of FIG. 1A of the first and second decoders being two separate decoding processors of the set of N decoding processors 115-1, . . . , 115-N. The situation of FIG. 2A is also applicable to the example of FIG. 1B of a multi-point conference, wherein the first decoder is at a first endpoint-a first destination terminal, and the second decoder is at a second destination terminal from the set of two or more destination terminals 121-1, 121-2, . . . .

One embodiment of the invention uses an error feedback method that provides for decoders to send, in one version a positive acknowledgement message (an ACK) to acknowledge successful receipt of a reference frame message, in another version, a negative acknowledgement message (a NACK) to indicate an error, and in yet another version an ACKs or a NACK back to the encoder to indicate successful or unsuccessful receipt, respectively of a reference frame message, e.g., to indicate which picture is to be an LTRF.

In one embodiment, ACKs and NACKs are sent to indicate successful receipt and decoding of a frame, including any reference frame commands therein. In one embodiment, in a mode that includes NACKs, there is information in the NACK so that the encoder knows exactly which frame was corrupted. In one embodiment, this includes counting slices at the decoder, and when all slices are successfully decoded, determining that the frame was successfully decoded.

Figure 2B:
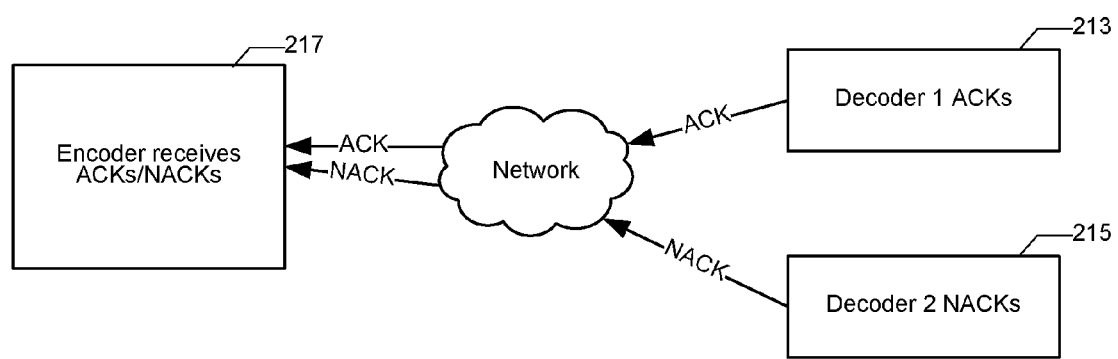
FIG. 2B shows the first and second decoder sending back error feedback and the encoder receiving the feedback according to an embodiment of the invention.

Considering now the case of FIG. 2A. The encoder, in particular the controller function of the encoder is operable to receive error-related feedback from each of the destination decoding processors regarding the reference frame message, e.g., a positive acknowledgement (ACK) whenever a reference frame message is correctly received, or a negative acknowledgement (NACK) whenever a reference frame message is not properly received. The decoders further are operable to send such feedback. FIG. 2B shows in 213 the first decoder that correctly receives the LTRF and reference frame message sending an ACK back to the encoder. In 215, the second decoder that detects an error sends a NACK back to the encoder to indicate that an error has occurred. In 217, the encoder receives the ACKs and NACKs from the decoders. One embodiment of the invention includes how an encoder deals with feedback from some but not all destination decoding processors.

At the encoder, one implementation includes, in the case no LTRF is available, the controller function 102 causing the encoder to send an I-frame to all decoders whenever the encoder, e.g., control function 102 ascertains that not all decoders have correctly received all packets, as a result of receiving a NACK in the case NACKs are used in the feedback, or whenever not all decoders have sent an ACK acknowledging proper receipt.

In one embodiment, only the encoder's receiving indication of success from all decoders (or not receiving an indication of error in NACK mode) results in the LTRF being available—valid—for use for encoding frames. A valid long term reference frame (valid LTRF) is a picture that is in the reference frame store and designated by both the encoder and all decoders for use as a LTRF. In embodiments of the present invention, a valid LTRF is a LTRF that has been acknowledged by all destination decoders to have been successfully received and marked for use as one of the possible LTRFs.

One embodiment of the invention improves on sending of I-frames in the case it is determined that there was an error receiving at all destination receivers, and includes in the case of such an error determination, the encoder using one of a set of one or more valid reference frames as a reference frame for interframe coding (temporal prediction).

Figure 2C:
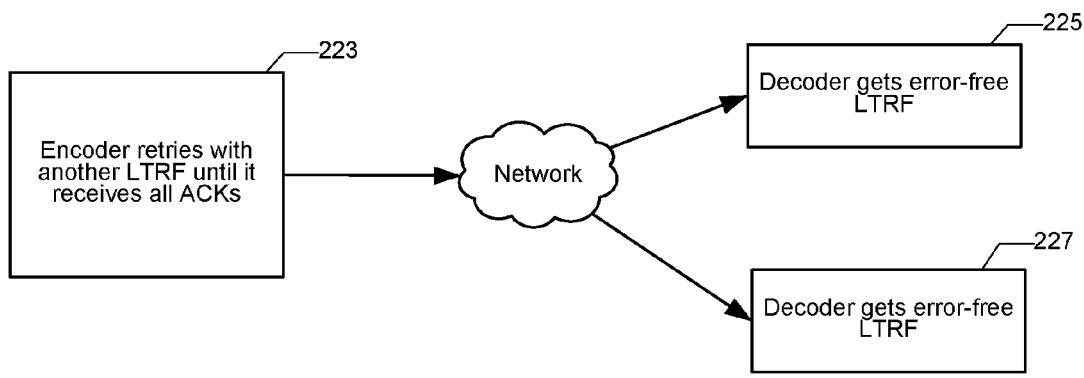
FIG. 2C shows in simplified form the encoder repeating attempting to form a long term reference frame and both the first and second decoders successfully receiving the reference frame message to form the long term reference frame according to an embodiment of the invention.
Figure 2D:
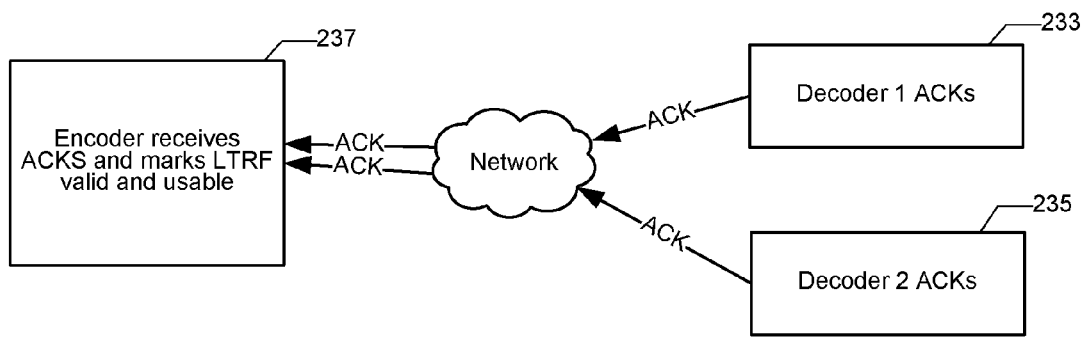
FIG. 2D shows the first and second decoders sending back feedback to acknowledge successful receipt, and the encoder marking the long term reference frame as usable and valid according to an embodiment of the invention.

In one embodiment, as shown in FIG. 2C, when the encoder discovers that the previous attempt to create an LTRF has failed in at least one of the decoders at the recipient or recipients, the encoder responds by creating a new frame which will be a new LTRF and which will replace the previous LTRF. The previous LTRF is marked to never be used. In 223, in one embodiment this process is repeated until a new LTRF is established in every listening decoder. FIG. 2C shows the first decoder, in 225 successfully receiving the new LTRF and associated reference frame message, and the second decoder, in 227 successfully receiving the new LTRF and associated reference frame message. FIG. 2D shows the first decoder in 233 and the second decoder in 235 responding with an ACK. In 237 the ACKs are received at the encoder, and as a result the encoder marks the LTRF valid and usable.

One embodiment further includes from time to time updating the valid reference frames with a more recent picture, and signaling such updating to the decoders. Any updated frame does not become valid until all decoders have successfully acknowledged receipt, e.g., of the reference frame message to so update the reference frame store. One embodiment further includes designating at the encoder one of the valid LTRFs to be the preferred LTRF to use as a reference for predictive coding when the encoder ascertains that there has been an error in receiving in at least one of the decoders. One embodiment includes from time to time changing which valid LTRF is preferred by the encoder to be used as a LTRF in the case of an error.

A Method Embodiment Using a Tentative LTRF

In one embodiment, a reference frame store in the encoder and a reference frame store in each destination decoder each includes a number denoted $N_F$ of reference pictures, of which a number, denoted $N_L$ may be LTRFs. In one example embodiment, $N_F=4$, and $N_L=2$. Thus, in the steady state, there may be two valid LTRFs.

In one embodiment, as shown in FIG. 1A or FIG. 1B, the encoder 103 is operable to generate video data that is sent in packets over the network 105. Each decoder of a plurality of decoders at the one or more destinations is operable to send messages back to the encoder with the information about whether it correctly received (ACK) or did not receive (NACK) each packet. Depending on the distances packets travel to the destination, in one embodiment, the round trip time for the encoder to receive this feedback is typically in the range of 300 to 400 ms, that is 6 to 12 video frames at 30 frames per second, but may be different.

One feature of embodiments of the present invention includes the encoder attempting to create a new LTRF including signaling the decoders, using a reference frame message, to make a recent frame a LTRF. Such a potential LTRF is called a "tentative" LTRF, and so signaling to the decoders to make a recent frame a LTRF is called making a tentative LTRF herein.

Thus a tentative LTRF is a frame that will become a valid LTRF once the signaling to the decoders is properly acknowledged to the encoder. Furthermore, one of the valid LTRF can be designated at the encoder to be preferred.

In one embodiment, the encoder includes a clock process, shown as update signal generator process ("Update signal generate") 109 that is configured to generate signals from time to time for the encoder to so attempt to create a new LTRF. Thus, a tentative LTRF is a frame, e.g., a frame in the reference frame store which is potentially a LTRF but has not yet been acknowledged by all destination decoders as correctly received.

In one embodiment, the update signal generator process 109 generates a signal periodically. The period in the case of periodic rather than non-periodic updating is in one embodiment, programmable to be any reasonable value. One example embodiment includes updating every 10 seconds, e.g., every 300 frames at 30 frames per second. However, being programmable, any other value can be used. Note that while one embodiment uses periodic updating, non-periodic updating also is possible in an alternate embodiment, e.g., in a random-like, e.g., pseudorandom schedule with an average time between updating.

One encoder embodiment generates a bitstream with a syntax compatible with ITU Rec. H.264. Such a bitstream can include a reference frame message for controlling reference frames, e.g., indicating which recently decoded frame in the encoder's and each decoder's reference frame store that contains decoded frames to use as a reference frame, and which to designate as a LTRF. In one embodiment, such signaling uses H.264 syntax including memory management control operation (mmco) commands and reference frame syntax. See Chapter 7 of the 03/2005 version of the ITU-T Rec. H.264 standard. For example, the encoder can send a message in the H.264 stream that commands a destination decoder to turn the most recent frame into a LTRF. This creates a tentative LTRF.

Once all destination decoders have acknowledged successful receipt of the reference frame message, a tentative LTRF becomes a valid LTRF.

One feature of an embodiment is that once there is at least one valid LTRF, i.e., one acknowledged LTRF, there is no further need for I frames for the duration of the video sequence, although in some embodiments, the encoder may be configured to send an I-frame from time to time, e.g., periodically, or in an alternate embodiment, non-periodically for random access considerations.

One encoder embodiment includes a state-machine in the encoder operable to control the choice of reference picture management commands that are signaled in the stream to the destination or destinations. In one embodiment, the state machine is formed by program instructions in the overall set of instructions 114 in memory 112 for execution by the encoding processor or processors 111.

One feature of the invention is that the commands in the reference frame message are such that the encoder can send the same reference frame message to all decoders independent of whether or not any destination decoder has previously sent an indication of an error, and independent of the state of the reference frame store in the destination decoders, including the cases of there being disparity in the contents of the reference frames stores of at least two decoders, and there being no disparity. Such same reference frame message can cause different actions in one or more of the decoders depending, for example, on whether or not the destination decoder correctly receives the reference frame message, and on the state of the reference frame store in the destination decoder. For example, a command to "unmark long term picture index 1" can simultaneously cause a first decoder that correctly received the message to delete the LTRF that has index value 1, cause a second decoder that did not correctly received this LTRF to delete the bad or partially received LTRF, have no effect on a decoder that did not correctly receive the reference frame message, and have no effect on a third decoder that does not contain any LTRFs.

In one embodiment, the encoder state machine can generate six different commands that the encoder responds to. Table 1 below describes the commands, shown with command codes 0-6, and the operation performed at the encoder.

TABLE 1

Encoding system commands

| Command code | Command description |
| --- | --- |
| 0 | Make regular P frame, e.g., use the previous frame as the reference frame to encode the present frame. |

TABLE 1-continued

Encoding system commands

| Command code | Command description |
| --- | --- |
| 1 | Make an I- frame, i.e.., encode a frame that does not reference another frame. |
| 2 | Change a non-preferred valid LTRF to the preferred LTRF, and make a new tentative LTRF, e.g., change current picture to a LTRF after waiting for 1 frame and signal a reference frame message to the decoders. |
| 3 | Make new tentative LTRF, e.g., change current picture to a LTRF after waiting for 1 frame and signal a reference frame message to the decoders. Such a frame becomes a tentative LTRF. |
| 4 | Use the preferred LTRF, e.g., use the most recent good LTRF as the reference frame to encode the present frame. |
| 5 | Use the valid LTRF not yet designated as preferred as the reference frame to encode the present frame. |

Figure 3:
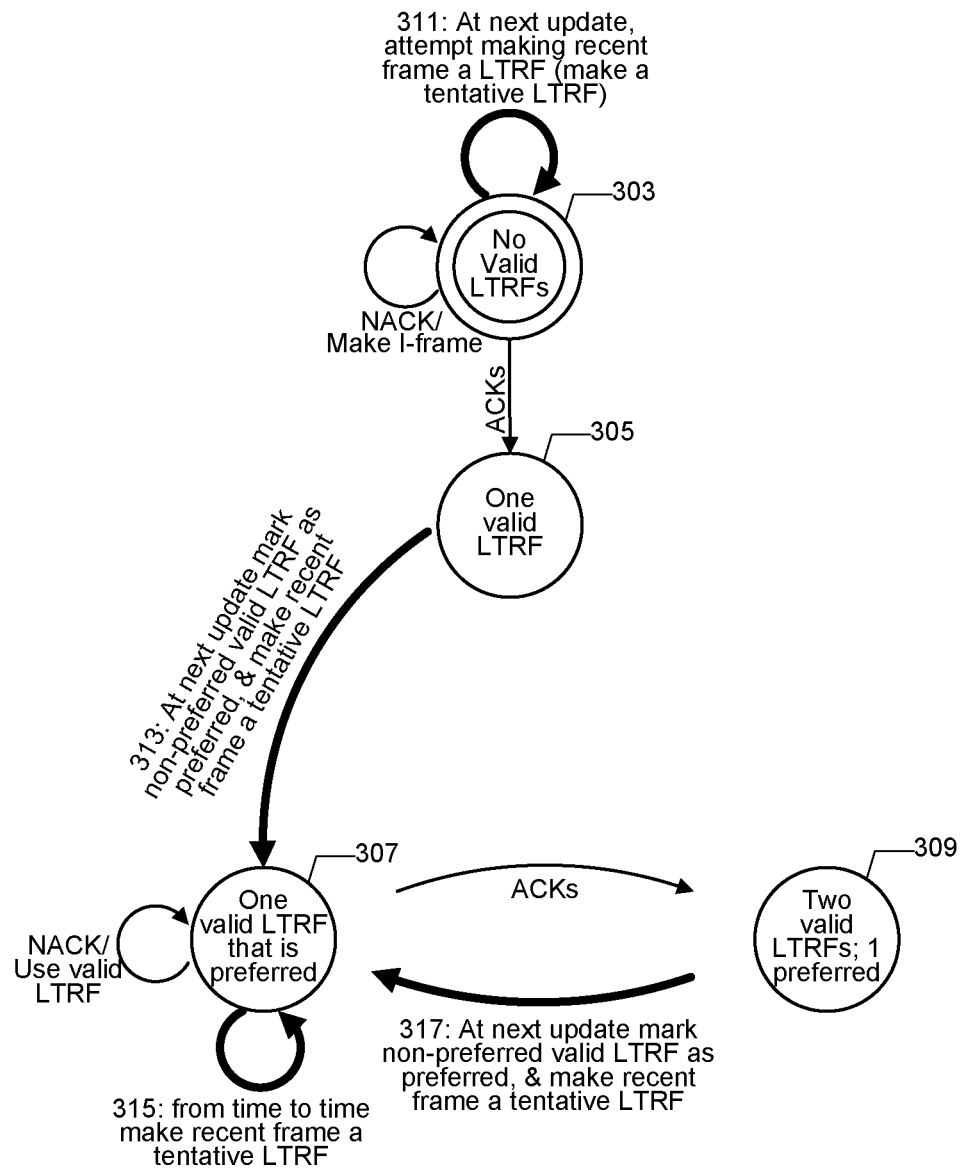
FIG. 3 shows in simplified form a state diagram at an encoder that operates according to an embodiment of the invention.

FIG. 3 shows a state transition diagram of one state machine for the case of at most two valid LTRFs.

Initially, as shown in state 303, there may no LTRFs valid. After an attempt at creating a LTRF, i.e., after a tentative LTRF is created, and this is acknowledged by all decoders, a state 305 exists in which there is one valid LTRF. Such a valid LTRF may be made the preferred LTRF in which case a state 307 exists of there being one valid LTRF which is the preferred LTRF. In one embodiment, the encoder attempts to create a second LTRF. If this succeeds, a state 309 exists in which there are two valid LTRFs, of which one is preferred.

In any state, each time that the update signal generator process 109 generates an update signal, the state machine generates one of the commands code 2 or 3. Furthermore, when in any of the states, when an error condition occurs, e.g., one of the decoders does not properly acknowledge receiving and decoding its part of a frame, the state machine generates one of the commands 1, 4, or 5. Furthermore, if feedback indicates that the decoder properly received the frame, or no error condition is received at the encoder, the state machine generates command 0 to encode an ordinary P-frame.

Table 2 below indicates for each state the action, e.g., per the command issued to the encoder by the state machine, at the next update signal from the update signal generator process 109. Table 2 further indicates for each state how the encoder encodes the next frame on ascertaining that one of the decoders had an error, e.g., a packet error. Table 2 includes the command code from Table 1 issued upon next update signal and upon any network error indicated from a decoder.

TABLE 2

| No. valid LTRFs | 0 | 1 valid LTRF | 1 valid LTRF; 1 preferred | 2 valid LTRFs; 1 preferred |
| --- | --- | --- | --- | --- |
| Action at next tick of update signal generat. | 3: Make tentative LTRF from recent frame | 2: Mark valid LTRF preferred, & make tentative LTRF | 3: Make tentative LTRF from recent frame | 2: Mark valid LTRF preferred, & make tentative LTRF |
| Network Error Action | 1: Make I frame | 5: Use valid LTRF | 4: Use preferred LTRF | 5: Use valid LTRF |

Referring to FIG. 3, at start-up, suppose there are no valid LTRFs (state 303). In this temporary start-up state, any error causes making an I-frame. At the next update signal, the encoder attempts to make a LTRF, i.e., creates a tentative LTRF, as shown in transition 311, by issuing command code 3. In one embodiment, the action 311 includes the encoder changing the current picture to a LTRF after waiting for 1 frame and signaling to the decoders by sending a reference frame message that this frame is to be an LTRF. This creates a tentative LTRF. In the case that there is an error, e.g., a NACK is received, an I-frame is generated and sent, and the state remains at 303. However, if all destination decoders send an ACK and all ACKS are received, the state machine transitions to state 305 wherein there is one valid LTRF. A network error in state 305 causes using the valid LTRF as a reference frame.

State 305 is a temporary state that lasts until the next update signal at which time, as shown in 313, command 2 is issued to mark the valid LTRF as the preferred LTRF, and make a new tentative LTRF, e.g., change the current picture to a LTRF after waiting for 1 frame and signaling this to the decoders.

The state thus transitions to state 307 wherein there is one valid LTRF which is preferred. In this state, the first time this state is reached, if there are no network errors, the state moves to state 309 where there are two valid LTRFs, one of which is preferred. In state 309, the next time an update signal occurs, state transition 317 includes issuing command 2, to mark the valid LTRF as the preferred LTRF, and make a new tentative LTRF, e.g., change the current picture to a LTRF after waiting for 1 frame and signaling this to the decoders. This transitions the state back to state 307. In state 307, when there is the next update signal from the update signal generator process 109, state transition 315 includes command 3 to make a new tentative LTRF, e.g., change the current picture to a LTRF after waiting for 1 frame and signaling this to the decoders. Should this fail, as indicated by at least one NACK, the process remains in state 307 and at the next update signal, state transition 315 again includes command 3 to make a new tentative LTRF.

Thus after the start-up states 303 and 305, the state machine remains in state 307 or 309, and alternates therebetween when all signaling is received correctly at the encoder.

Figure 4:
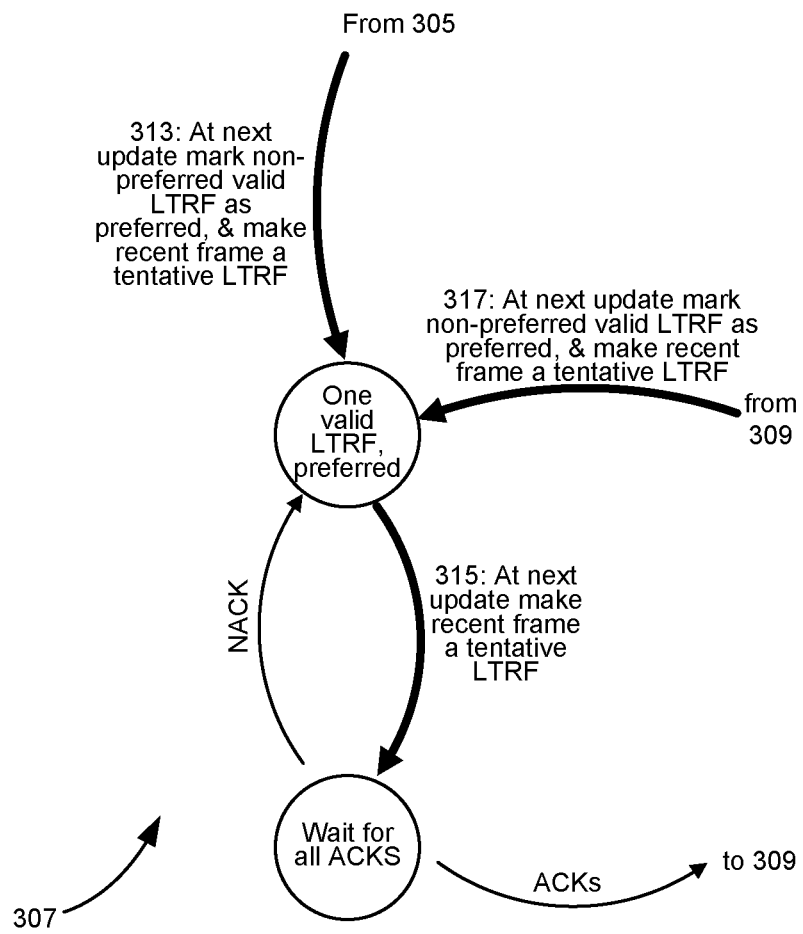
FIG. 4 shows one of the states of the state diagram of FIG. 3 in more detail.

Note that FIG. 3 shows a state diagram in simplified form. Some states, for example, may include temporary wait states. State 307, for example, is such a state. FIG. 4 shows state 307 in more detail. Transition 315 does not go from state 307 directly back to state 307, but rather when at the next update signal, a recent frame is made to a tentative LTRF, transition 315 is to a wait state at which the encoder waits to receive ACKs from all the receivers. If a NACK is received from any one receiver, then the transition is back to the same state 307. Else, if all ACKs are received, the transition is to state 309.

The Reference Message

In one embodiment, the reference frame store, typically a decoded frame buffer has a size that provides for a number $N_F$ frames that are available for use as either short term reference frames or long term memory. One embodiment uses for the reference message sent in the bitstream for replacement of LTRFs the H.264 syntax including memory management control operation (mmco) commands ("mmco commands") and reference frame syntax. See Chapter 7 of the 03/2005 version of the ITU-T Rec. H.264 standard. FIG. 5 shows a summary of H.264 mmco commands and their meanings.

When, in particular, the reference message sent in the bitstream for replacement of LTRFs is not received by at least one decoder, the decoders' reference frame store becomes different from the encoder's reference frame store. One feature of embodiment of the invention includes signaling the formation of LTRFs and their replacement of LTRFs in such a way that the same signaling, i.e., the same reference frame message works when there is a disparity between at least one decoder's reference frame store and the encoder's reference frame store, as when no disparity occurs, and for the startup states wherein no valid LTRF or only one valid LTRF is in the reference frame store.

Consider the example of the update signal generator process 109 generating an update signal every 300 frames. When such a signal occurs, in one embodiment, the reference frame message, in the form of mmco commands are sent in the bitstream, one frame after the frame that will become the new LTRF is coded. The frame that will become the LTRF in one embodiment is first used as a short term reference frame before it converts to a long term reference frame.

In all other cases, say in 299 out of 300 frames, no reference frame message, e.g., mmco commands are sent in the bitstream.

In one embodiment, the content and format of the reference frame message is always the same, except for which long term reference index to use. Denote the long term reference index by "lt_index".

Recall that in the example implementation, NR, the number of possible LTRFs is 2. The index of the LTRF, denoted long_term_pic_num can take on value 0 or 1.

In the steady state, in one embodiment, every 300 frames, a different lt_index is used in the reference frame message, unless there was an error the last time in which case the LTRF index is used.

The reference frame message is given by the following pseudocode:

---

Pseudocode 1: Reference frame message mmco = 2 (unmark long term reference frame)
long_term_pic_num = lt_index
mmco = 1 (unmark short term reference frame)
difference_of_pic_nums_minus1 = 1
mmco = 3 (assign long term reference index)
difference_of_pic_nums_minus1 = 0
long_term_pic_num = lt_index
mmco = 0 (end of mmco messages)

--- where lt_index alternates between 0 and 1, unless not all decoders succeed, in which case the next mmco message uses the same lt_index. In the H.264 syntax, difference_of_pic_nums_minus1 is used (with mmco=3, or mmco=1) to assign a LTRF index to a short-term reference picture or to mark a short-term reference picture as "unused for reference".

The use of the same above reference frame message format has the following feature: if some slices for the signaling frame (one frame after LTRF) are received and others are not, the next time a reference frame message is sent and received correctly, all decoders will synchronize back to the same reference frame store state. This is because the lt_index of the picture being unmarked has the same value (0 or 1 in one embodiment) as the lt_index of the picture being simultaneously assigned long term.

Suppose, for example, the first reference frame message replaces the LTRF with index 0, i.e., lt_index=0. In the case that some decoders failed to successfully receive the first reference frame message, the same index will be used the next time. Consider those decoders that failed to receive the first reference frame message. The next first reference frame message will again replace the LTRF with index 0. Suppose there is success this next time. This causes replacing the LTRF with index 0 in the reference frame store.

Consider on the other hand those decoders that succeeded in receiving the first reference frame message. LTRF with index 0 is now newer than in the failed decoders. Suppose there is success this next time. This causes replacing the LTRF with index 0 in the reference frame store, the same as in the other decoders.

The ending state is the same in both decoders that have success, and those that did not; after there is at least one failure, the LTRF after the second reference frame message is successfully received by all destination decoders results in a new LTRF with index 0, and the LTRF with index 1 remaining the same.

Another important property of this format is, there is always one short term picture being unmarked and there is always one long term picture being unmarked, even when those pictures may not necessarily be present in the reference frame store, e.g. at startup or soon after an I-frame is sent. Non-existing frames being unmarked are ignored by the decoders. Again this is critical when some decoders lose the signaling picture. No special reference frame message, of a different format, needs to be sent to fix up errant decoders while a different reference frame message is simultaneously sent to good decoders. Sending different messages to different destination decoders depending on whether or not the destination decoders had success can become unworkable when there is more than one decoding endpoint, e.g., in multipoint videoconferencing such as shown in FIG. 1B. It is desired for the encoder to create only one bitstream for all endpoints.

Note that in one embodiment, a computer-readable carrier medium carries a set of instructions that when executed by one or more processors of an encoder cause the one or more processors to carry out a method in the encoder of signaling LTRFs as described herein, e.g., under control of a state machine.

While the description herein includes only P frames, extending the invention to include other temporal predictive encoding also is possible.

It should be appreciated that although the invention has been described in the context of the ITU-T H.264 standard, the invention is not limited to such contexts and may be utilized in various other applications and systems, for example in other encoders that encode using temporal interframe coding using reference frames.

It should further be appreciated that although the invention has been described in the context of the ITU-T H.264 standard, the invention is not limited to such contexts and may be utilized in various other applications and systems, for example in a system that uses MPEG1, MPEG2, ITU-263, or other compressed media streams using an encoder that encodes using temporal interframe coding using reference frames. Furthermore, the invention is not limited to any one type of network architecture and method of encapsulation, and thus may be utilized in conjunction with one or a combination of other network architectures/protocols.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of an encoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions, a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
    an encoder at a source sending compressed video data including a reference frame message to create a long term reference frame from a recent frame indicated in the reference frame message, the recent frame being encoded and included in the compressed video data, the sending being to a plurality of decoders at one or more destination points, wherein the same compressed video data is sent to the plurality of decoders; and
    receiving feedback from the plurality of decoders indicative of whether or not the decoders successfully received the reference frame message and have access to the indicated recent frame,
    in the case that the received feedback is such that at least one of the decoders did not successfully receive the reference frame message or does not have the indicated recent frame, repeating sending a reference frame message to create the long term reference frame from an indicated recent frame to the plurality of decoders, and receiving feedback until the encoder has received feedback from each of the plurality of decoders indicating successful receipt of the reference frame message and indicating having access to the recent frame indicated in the reference frame message,
    such that once the encoder has an indication of successful receipt and access at all decoders, the encoder, upon receiving feedback of an error from at least one of the decoders, is operable to use the long term reference frame as a reference frame for temporal predictive encoding of video, thereby enabling the encoder to avoid using an independently coded frame upon receiving feedback of an error.

2. A method as recited in claim 1, further comprising,
    the encoder from time to time sending an additional reference frame message to create a different long term reference frame from a different recent frame indicated in the reference frame message, the sending being to the plurality of decoders at the one or more destination points, such that the long term reference frame is updated from time to time with an updated frame, any updated frame not becoming valid for use as a reference frame until the encoder has received feedback from all decoders that each has successfully received the reference frame message and has the updated frame.

3. A method as recited in claim 2, wherein the sending from time to time is periodic.

4. A method as recited in claim 2, wherein each decoder has a decoder store, and wherein the reference frame store at each decoder is configured to store more than one frame marked for use as a long term reference frame.

5. A method as recited in claim 4, wherein a valid long term reference frame is one that exists and is known to the encoder to exist in the reference frame store of each decoder and marked for use as a long term reference frame, the method further comprising designating at the encoder one of the valid long term reference frames to be a preferred long term reference frame to use as a reference frame for predictive coding when the encoder ascertains that there has been an error in receiving in at least one of the decoders.

6. A method as recited in claim 4, wherein a valid long term reference frame is one that exists and is known to the encoder to exist in the reference frame store of each decoder and marked for use as a long term reference frame, the method further comprising:
    designating at the encoder one of the valid long term reference frames to be a preferred long term reference frame to use as a reference frame for predictive coding when the encoder ascertains that there has been an error in receiving in at least one of the decoders;
    from time to time changing which valid long term reference frame is the preferred long term reference frame.

7. A method as recited in claim 2, wherein the sending of the reference frame message is controlled by a state machine.

8. A method as recited in claim 2, wherein commands are included in the reference frame message such that the encoder can send the same reference frame message to all decoders independent of whether or not any destination decoder has previously sent an indication of an error, and independent of the state of the reference frame store in the destination decoders, including the case of there being disparity in the contents of the reference frames stores of at least two decoders, and there being no disparity.

9. A method as recited in claim 8, wherein commands are included in the reference frame message such that if at least part of a frame sent by the encoder for use as the long term reference frame is not correctly received by any decoder, and other decoders correctly receive the frame sent by the encoder for use as the long term reference frame, the next time a reference frame message is sent and received correctly by all decoders, all decoders will have the same reference frame store state.

10. A method as recited in claim 8, wherein the reference frame message includes a command to unmark one frame previously marked in a destination decoder's reference frame store for use as a short term reference frame and a command to unmark one frame previously marked in a destination decoder's reference frame store for use as a long term reference frame, wherein at any particular destination decoder a command to unmark is ignored in the case the frame commanded to be unmarked is not present in the particular decoder's reference frame store.

11. A method as recited in claim 1, wherein the indicated frame in the reference frame message is only valid for use as a long term reference frame as a result of the encoder's receiving feedback from all decoders that each has successfully received the reference frame message and the indicated frame, and wherein each of the plurality of decoders includes a reference frame store operable to store a set of reference frames including one or more frames marked for use as possible long term reference frames, such that a valid long term reference frame is one that exists and is known to the encoder to exist in the reference frame store of each decoder and marked for use as a long term reference frame.

12. A method as recited in claim 1, wherein the plurality of decoders include more than one decoder of a decoding system at a single destination, the more than one decoder of the decoding system operable in parallel to each decode a different part of a frame.

13. A method as recited in claim 1, wherein the plurality of decoders include decoders at different destinations.

14. An apparatus comprising:
   a network interface operable to be coupled to a network;
   an encoder coupled to the network interface and operable to generate compressed video data and to embed therein a reference frame message to command any receiving decoder to create a long term reference frame from a recent frame indicated in the reference frame message, the recent frame being encoded and included in the compressed video data,
   a controller coupled to the network interface and the encoder and operable to cause the encoder to send the compressed video data with the reference frame message embedded therein, the sending being via the network to a plurality of decoders at one or more destination points, the controller further operable to accept feedback received from the plurality of decoders indicative of whether or not the decoders successfully received the reference frame message and have access to the indicated recent frame, wherein the same compressed video data is sent to the plurality of decoders,
   the controller further operable in the case that the received feedback is such that at least one of the decoders did not successfully receive the reference frame message or does not have the indicated recent frame, to cause the encoder to repeating sending a reference frame message to create the long term reference frame from an indicated recent frame to the plurality of decoders, the controller further operable to receiving feedback until feedback is received from each of the plurality of decoders indicating successful receipt of the reference frame message and indicating having access to the recent frame indicated in the reference frame message,
such that once the controller has an indication of successful receipt and access at all decoders, the controller, upon indication that feedback of an error was received from at least one of the decoders, is operable to cause the encoder to use the long term reference frame as a reference frame for temporal predictive encoding of video, thereby enabling the encoder to avoid using an independently coded frame as a result of the apparatus receiving feedback of an error.

15. An apparatus as recited in claim 14, wherein the controller is operable to cause the encoder from time to time to send an additional reference frame message to create a different long term reference frame from a different recent frame indicated in the reference frame message, the sending being to the plurality of decoders at the one or more destination points, such that the long term reference frame is updated from time to time with an updated frame, any updated frame not becoming valid for use as a reference frame until the encoder has received feedback from all decoders that each has successfully received the reference frame message and has the updated frame.

16. An apparatus as recited in claim 15, wherein each decoder has a decoder store, and wherein the reference frame store at each decoder is configured to store more than one frame marked for use as a long term reference frame.

17. An apparatus as recited in claim 16, wherein a valid long term reference frame is one that exists and is known to the encoder to exist in the reference frame store of each decoder and marked for use as a long term reference frame, and wherein the controller further is operable to designate at the encoder one of the valid long term reference frames to be a preferred long term reference frame to use as a reference frame for predictive coding when the controller ascertains that there has been an error in receiving in at least one of the decoders.

18. An apparatus as recited in claim 16, wherein a valid long term reference frame is one that exists and is known to the encoder to exist in the reference frame store of each decoder and marked for use as a long term reference frame, wherein the controller further is operable to designate at the encoder one of the valid long term reference frames to be a preferred long term reference frame to use as a reference frame for predictive coding when the controller ascertains that there has been an error in receiving in at least one of the decoders, and wherein the controller is operable to from time to time change which valid long term reference frame is the preferred long term reference frame.

19. An apparatus as recited in claim 15, wherein the controller includes a state machine to control the sending of the reference frame message.

20. An apparatus as recited in claim 14, wherein the indicated frame in the reference frame message is only valid for use as a long term reference frame as a result of the encoder's receiving feedback from all decoders that each has successfully received the reference frame message and the indicated frame, and wherein each of the plurality of decoders includes a reference frame store operable to store a set of reference frames including one or more frames marked for use as possible long term reference frames, such that a valid long term reference frame is one that exists and is known to the encoder to exist in the reference frame store of each decoder and marked for use as a long term reference frame.

21. An apparatus as recited in claim 14, wherein the plurality of decoders include more than one decoder of a decoding system at a single destination, the more than one decoder of the decoding system operable in parallel to each decode a different part of a frame.

22. An apparatus as recited in claim 14, wherein the plurality of decoders include decoders at different destinations.

23. A computer-readable hardware storage medium configured with instructions that when executed by one or more processors of a processing system, cause carrying out of a method comprising:
   an encoder at a source sending compressed video data including a reference frame message to create a long term reference frame from a recent frame indicated in the reference frame message, the recent frame being encoded and included in the compressed video data, the sending being to a plurality of decoders at one or more destination points, wherein the same compressed video data is sent to the plurality of decoders; and receiving feedback from the plurality of decoders indicative of whether or not the decoders successfully received the reference frame message and have access to the indicated recent frame, in the case that the received feedback is such that at least one of the decoders did not successfully receive the reference frame message or does not have the indicated recent frame, repeating sending a reference frame message to create the long term reference frame from an indicated recent frame to the plurality of decoders, and receiving feedback until the encoder has received feedback from each of the plurality of decoders indicating successful receipt of the reference frame message and indicating having access to the recent frame indicated in the reference frame message, such that once the encoder has an indication of successful receipt and access at all decoders, the encoder, upon receiving feedback of an error from at least one of the decoders, is operable to use the long term reference frame as a reference frame for temporal predictive encoding of video, thereby enabling the encoder to avoid using an independently coded frame upon receiving feedback of an error.

24. A computer-readable hardware storage medium as recited in claim 23, wherein the method further comprises, the encoder from time to time sending an additional reference frame message to create a different long term reference frame from a different recent frame indicated in the reference frame message, the sending being to the plurality of decoders at the one or more destination points, such that the long term reference frame is updated from time to time with an updated frame, any updated frame not becoming valid for use as a reference frame until the encoder has received feedback from all decoders that each has successfully received the reference frame message and has the updated frame.

* * * * *